(12) United States Patent
Cheung et al.

(10) Patent No.: US 12,268,339 B2
(45) Date of Patent: Apr. 8, 2025

(54) AUTOMATED COOKING SYSTEM

(71) Applicant: HESTIA TECHNOLOGY LIMITED, Hong Kong (HK)

(72) Inventors: Chim Lee Cheung, Hong Kong (HK); Chun Kit Chan, Hong Kong (HK); Hing Choi Fu, Hong Kong (HK); Ka Tak Lee, Hong Kong (HK); Ming Him Melvin Tsui, Hong Kong (HK)

(73) Assignee: HESTIA TECHNOLOGY LIMITED, Hongkong (HK)

( * ) Notice: Subject to any disclaimer, the term of this patent is extended or adjusted under 35 U.S.C. 154(b) by 718 days.

(21) Appl. No.: 17/616,981

(22) PCT Filed: Jul. 31, 2020

(86) PCT No.: PCT/IB2020/057243
§ 371 (c)(1),
(2) Date: Dec. 6, 2021

(87) PCT Pub. No.: WO2021/024124
PCT Pub. Date: Feb. 11, 2021

(65) Prior Publication Data
US 2022/0160178 A1   May 26, 2022

(30) Foreign Application Priority Data
Aug. 2, 2019  (HK) ................................. 19127660.9

(51) Int. Cl.
*A47J 44/00* (2006.01)
*A47J 36/02* (2006.01)
(Continued)

(52) U.S. Cl.
CPC .............. *A47J 44/00* (2013.01); *A47J 36/02* (2013.01); *A47J 36/165* (2013.01); *A47J 36/32* (2013.01);
(Continued)

(58) Field of Classification Search
CPC .. A47L 15/0092; A47L 15/4214; A47L 15/16; A47L 15/0097; A47J 36/34;
(Continued)

(56) References Cited

U.S. PATENT DOCUMENTS 3,685,432 A * 8/1972 Hoeberigs ........... A47J 37/1228
99/357
5,029,520 A * 7/1991 Okada ................. G07F 17/0085
99/357
(Continued)

FOREIGN PATENT DOCUMENTS

CN    103919491 A    7/2014
CN    105902136 A    8/2016
(Continued)

*Primary Examiner* — Eric S Stapleton
(74) *Attorney, Agent, or Firm* — Muncy, Geissler, Olds & Lowe, P.C

(57) ABSTRACT

An automatic cooking system with a cooking tool includes an ingredient storage and feeding apparatus and an ingredient conveying and dispensing apparatus. The ingredient storage and feeding apparatus includes a plurality of storage units with inlets and outlets, a plurality of ingredient boxes are provided between the inlets and outlets. The ingredient conveying and dispensing apparatus includes a work position located on one side of the cooking tool. The ingredient conveying and dispensing apparatus transports the ingredient boxes to the work position and then rotates so that the ingredient boxes are turned over to pour the required ingredients into the cooking tool. The automatic cooking system realizes the integration of the classified storage and transportation of ingredients, a single ingredient is used as a storage unit, and ingredients can be automatically transported from different storage units to the pot according to the order of adding the ingredients to the dishes.

10 Claims, 18 Drawing Sheets

(51) Int. Cl.
    *A47J 36/16*     (2006.01)
    *A47J 36/32*     (2006.01)
    *A47J 36/34*     (2006.01)
    *A47J 47/01*     (2006.01)
    *A47L 15/00*     (2006.01)
    *A47L 15/16*     (2006.01)
    *A47L 15/42*     (2006.01)
    *B65G 1/137*     (2006.01)
    *B25J 11/00*     (2006.01)

(52) U.S. Cl.
    CPC ............... *A47J 36/34* (2013.01); *A47J 47/01* (2013.01); *A47L 15/0092* (2013.01); *A47L 15/0097* (2013.01); *A47L 15/16* (2013.01); *A47L 15/4214* (2013.01); *B65G 1/137* (2013.01); *B25J 11/0045* (2013.01)

(58) Field of Classification Search
    CPC .. A47J 44/00; A47J 36/32; A47J 47/01; A47J 36/02; A47J 36/165; B65G 1/137; B25J 9/023; B25J 11/0045
    USPC .......................................................... 99/334
    See application file for complete search history.

(56) References Cited

U.S. PATENT DOCUMENTS

| | | | | |
|---|---|---|---|---|
| 5,224,415 | A * | 7/1993 | McFadden | A47J 37/1228 222/146.6 |
| 9,895,018 | B2 * | 2/2018 | Lin | A47J 37/04 |
| 10,264,916 | B2 * | 4/2019 | Shivaiah | A47J 36/321 |
| 10,617,253 | B2 * | 4/2020 | Aboujassoum | A47J 43/046 |
| 11,610,276 | B1 * | 3/2023 | Cohen | G06Q 10/06316 |
| 11,717,105 | B2 * | 8/2023 | Aboujassoum | A47J 36/06 99/325 |
| 2003/0063969 | A1 * | 4/2003 | Chirnomas | G07F 11/1657 414/277 |
| 2003/0085237 | A1 * | 5/2003 | Kateman | A23G 9/228 99/450.7 |
| 2004/0238555 | A1 * | 12/2004 | Parks | G07F 9/105 221/80 |
| 2004/0250554 | A1 * | 12/2004 | Kateman | A23G 9/281 62/71 |
| 2005/0193901 | A1 * | 9/2005 | Buehler | A23L 5/10 99/468 |
| 2013/0101714 | A1 * | 4/2013 | Buehler | A23L 5/10 99/341 |
| 2014/0141129 | A1 * | 5/2014 | Greene | B65D 85/8058 426/87 |
| 2014/0224826 | A1 * | 8/2014 | Otzen | G07F 11/10 221/1 |
| 2015/0013550 | A1 * | 1/2015 | Lin | A47J 37/04 99/404 |
| 2015/0122846 | A1 * | 5/2015 | Stanley | B65D 47/32 222/206 |
| 2015/0144653 | A1 * | 5/2015 | Kline | G07F 9/001 222/23 |
| 2015/0245421 | A1 * | 8/2015 | Heczko | H05B 6/1245 99/323.3 |
| 2016/0242434 | A1 * | 8/2016 | Jones | A23G 9/225 |
| 2016/0324359 | A1 * | 11/2016 | Aboujassoum | A47J 43/046 |
| 2017/0221296 | A1 * | 8/2017 | Jain | G07F 17/0064 |
| 2017/0354294 | A1 * | 12/2017 | Shivaiah | A47J 36/321 |
| 2018/0127192 | A1 * | 5/2018 | Cohen | G07F 11/68 |
| 2019/0125126 | A1 * | 5/2019 | Cohen | G07F 17/0064 |
| 2020/0086437 | A1 * | 3/2020 | Johnson | B25J 9/1674 |

FOREIGN PATENT DOCUMENTS

| | | |
|---|---|---|
| CN | 109497820 A | 3/2019 |
| CN | 109674337 A | 4/2019 |
| CN | 109700344 A | 5/2019 |
| EP | 3150092 A1 | 4/2017 |
| HK | 30006163 A2 | 5/2020 |
| JP | 6545150 B2 | 6/2019 |
| TW | 201250568 A | 12/2012 |

* cited by examiner

AUTOMATED COOKING SYSTEM

TECHNICAL FIELD

The present invention relates to an automatic cooking system.

BACKGROUND ART

Cooking is indispensable for survival and development of the human. Since ancient times, people have performed cooking activities for once or more every day. The cooking utensils, ingredients, seasonings and processes used in different dishes for a meal are different. If a person only completes one dish according to the steps at one time, it often takes a long time to cook a meal. With the continuous progress of the society, various cooking utensils have been greatly improved, which saves a certain amount of processing time. However, the production of dishes still needs to be completed manually according to the steps, which undoubtedly cannot meet the rapid pace of people's life nowadays.

With the rapid development of intelligent technologies such as automation and the Internet of Things, etc., some intelligent systems that can replace some manual cooking operations have appeared, but their automation degree and cooking quality are far from meeting the living demands, such as the following problems to be resolved.
1. Various ingredients for cooking need to be manually mixed according to each dish before cooking;
2. The ingredients for cooking dishes cannot be added in order;
3. Due to so many kinds of seasonings used in Chinese dishes and the demand for preparing special gorgon juice, the mixed seasonings are easy to precipitate or condense;
4. Many Chinese dishes are fried, and automatic cooking components often cannot meet special operations;
5. The warranty period of the used sauces and other condiments is not monitored;

For the problems in the automatic cooking listed above, further optimization and improvement are needed to improve the automation degree of the overall cooking process and the rationality of each link, so as to meet people's living demand in a true sense.

SUMMARY OF THE INVENTION

The technical problem to be solved by the present invention is to provide an innovative automatic cooking system, which realizes the integration of classified storage and transportation of ingredients. A single ingredient is used as a storage unit, and the ingredients can be transported from different storage units according to the order of adding the ingredients to the dishes automatically to a pot, so that a cooking machine can cook more different styles of dishes, thereby not only avoiding change in the taste due to the mixing of various ingredients before cooking but also keeping the ingredients fresh. At the same time, the use of a seasoning box with a stirring function prevents the precipitation and coagulation of seasonings. In addition, it is equipped with seasoning expiration recognition reminder function.

The technical means employed in the present invention are as follows.

An automatic cooking system with a cooking apparatus, which comprises a cooking tool, wherein it comprises an ingredient storage and feeding apparatus, and an ingredient conveying and dispensing apparatus; the ingredient storage and feeding apparatus comprises a plurality of storage units, each storage unit is provided with an inlet and an outlet; a plurality of ingredient boxes are provided between the inlet and the outlet; the ingredient conveying and dispensing apparatus is provided with a work position, which is located on one side of the cooking tool; and the ingredient conveying and dispensing apparatus transports the ingredient boxes along the XYZ axis to the work position and then rotates, thereby causing the ingredient boxes to turn over and pour the required ingredients into the cooking tool.

Preferably, the inlet and the outlet are respectively located at the upper and lower ends of the storage units; each of the ingredient boxes is provided with a rib sequentially arranged inside the storage units in order from top to bottom; blocking arms are provided on both sides of the outlet; the ingredient conveying and dispensing apparatus comprises a vertical moving apparatus and a horizontal transfer apparatus arranged on it, the horizontal transfer apparatus is located below the storage units, is deployed and runs along the X axis, and moves along the Y axis through the vertical moving apparatus; a plurality of groups of clamping plates corresponding to each of the storage units are provided on both sides of the horizontal transfer apparatus; a pneumatic gripper is provided at the bottom joint of the one of the groups of clamping plates for opening and closing it; a proximity sensor is provided beside each of the groups of clamping plates of the horizontal transfer apparatus; a vertical moving apparatus is arranged vertically upward at the work position, and it can drive the horizontal transfer apparatus to move up and down along the Y axis; the ingredient conveying and dispensing apparatus further comprises a linear drive apparatus arranged along the Z axis, and a rotary gripper is connected below it; the rotary gripper extends forward with a clamping jaw; the linear drive apparatus drives the rotary gripper to move back and forth along the Z axis to above the cooking tool; and the rotating gripper drives the clamping jaw to rotate and open and close along a first rotating shaft.

Preferably, a recovery apparatus is provided at the bottom of the ingredient storage and feeding apparatus, it comprises an ingredient box circulation channel and a recovery box, the diameter of the ingredient box circulation channel is larger than that of the ingredient boxes.

Preferably, the cooking apparatus further comprises a peripheral supporting structure and a dishing-up tool; wherein the inner wall on one side of the supporting structure is provided with a rotation drive apparatus, which can drive the cooking tool to rotate along a third rotating shaft; a plate sensor is provided on the outer edge; the cooking tool is located in the middle of the supporting structure, it comprises a cooking pot box, the inside of which is provided with a cooking pot, and the outer wall is provided with a rotation connection apparatus; the inner wall of the cooking pot is provided with a stirring wing, and the bottom center is provided with a coupling apparatus connected with a drive apparatus, and a plurality of heating apparatuses are provided around the bottom and on the outer wall; the rotation connection apparatus is connected to the rotation drive apparatus to drive the cooking pot box to rotate; the dishing-up tool comprises a control apparatus and a dishing-up rack, wherein the control apparatus is fixed on one side of the supporting structure, and the outer end of the control apparatus is flexibly connected to the dishing-up rack, and the dishing-up rack extends to directly below the bottom of the cooking pot box; and the control apparatus drives the dishing-up rack to rotate along a fourth rotating shaft.

Preferably, the upper edge of the cooking pot box is provided with a plug, which comprises a base portion and an insertion portion. The side wall of the base portion is provided with a plurality of openings and a first magnet. The insertion portion is provided with a pin corresponding to the openings and a second magnet corresponding to the first magnet. The bottom of the cooking pot box is provided with a fan; the bottom of the cooking pot is provided with a plurality of third magnets; and the inner side wall of the cooking pot is coated with a non-adhesive coating.

Preferably, it further comprises a seasoning dispensing apparatus, which comprises a seasoning storage apparatus, a seasoning stirring apparatus, a seasoning transfer pipe and a seasoning nozzle; the seasoning storage apparatus comprises a plurality of sauce storage boxes, the upper end of which is provided with an inner interface; a corresponding outer interface is provided above the inner interface; the outer interface is connected upwards with a seasoning transfer pipe to extend to the corresponding seasoning nozzle; the seasoning stirring apparatus comprises a stirring box, the inside of which is provided with one or more stirrers, a straw and an upper and a lower water level sensors, and its outer wall is provided with a stirring drive apparatus which is connected to the stirrers; the straw is connected upward to a seasoning transfer pipe and extends to the corresponding seasoning nozzle; a seasoning pump and a flow sensor are connected to the seasoning transfer pipe; a radio frequency identification mark is provided on the sauce storage box; and the straw is spiral.

Preferably, it further comprises a cleaning apparatus, which comprises a water tank and a cleaning pipe; one end of the cleaning pipe is provided with a cleaning nozzle, and the other end is connected to a water vapor input apparatus; the cleaning nozzle is located above the water tank and below the cooking pot box, and it can rotate and spray water upward; and the cleaning pipe is connected to a solenoid valve.

The beneficial effects of the present invention are as follows: a single ingredient is set as a storage unit, there are a plurality of storage units with different ingredients, and the ingredients are automatically sent to the cooking utensils in the required order for different dishes, thereby realizing the integration of classified storage and transportation of the ingredients, increasing the types of automatically cooked dishes, avoiding the change of smell due to mixing of ingredients, keeping the ingredients fresh as well as automatically recycling the empty ingredient storage boxes; a seasoning box with stirring function is provided to avoid the precipitation and condensation of the mixed sauce; and a sauce warranty period monitoring system is provided, thereby not only improving the automation effect, reducing human intervention, improving cooking efficiency and saving manpower but also improving the quality and safety of cooking dishes.

DETAILED DESCRIPTION

Figure 1:
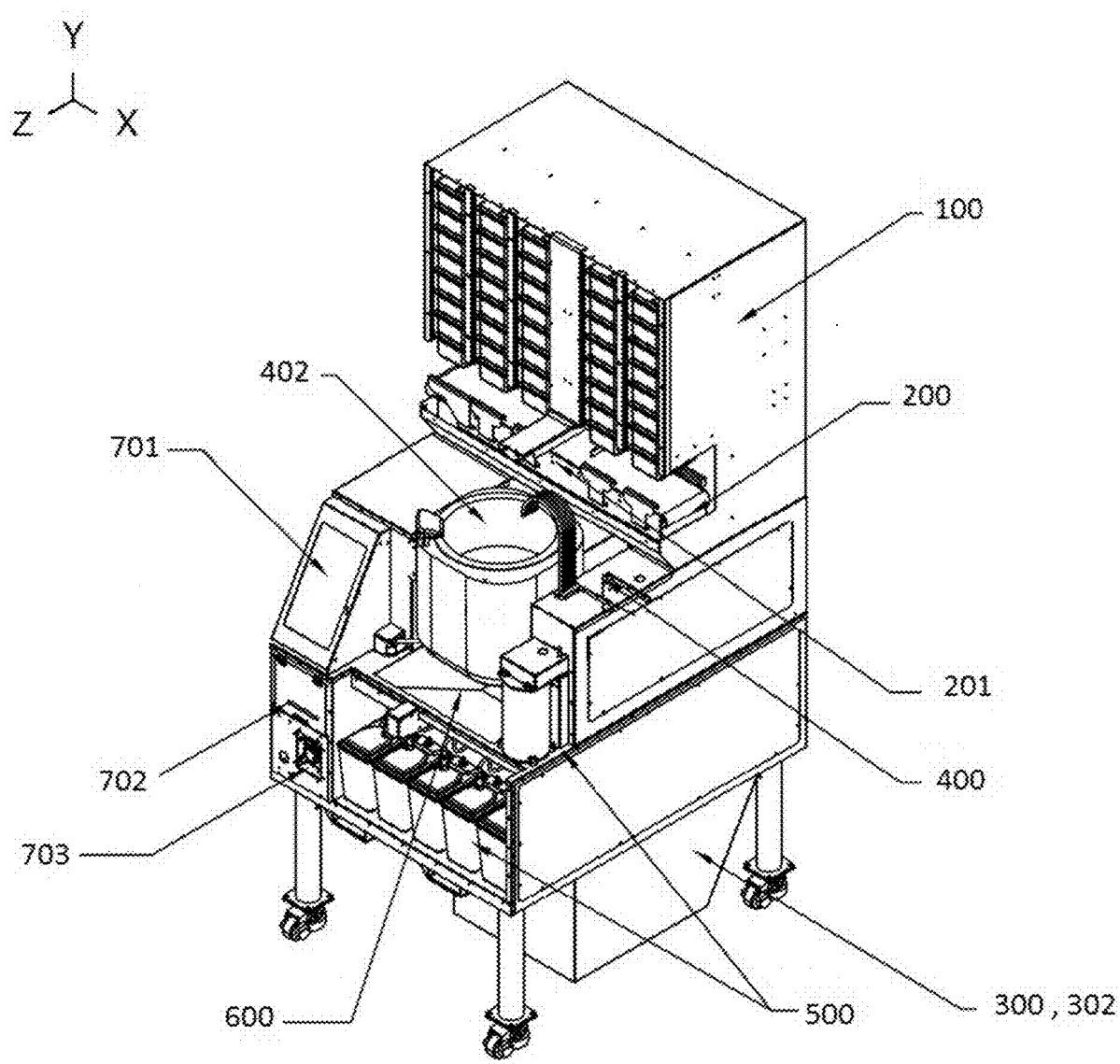
FIG. 1 is a schematic diagram of an overall structure of an automatic cooking system of the present invention.
Figure 2:
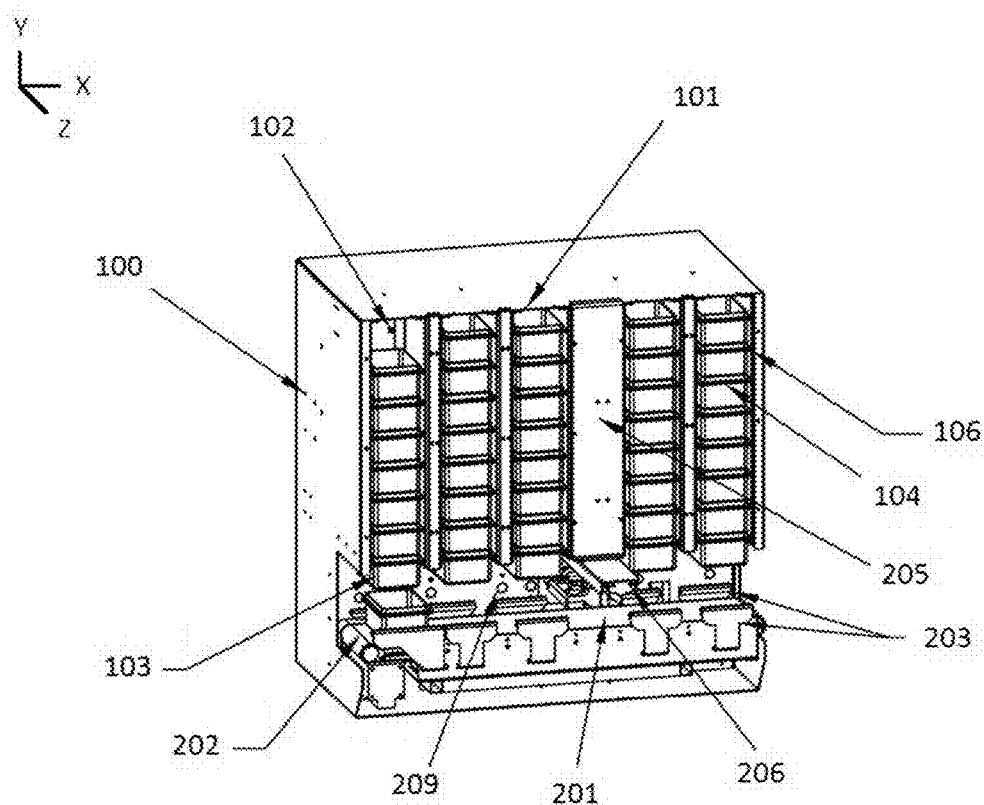
FIG. 2 is a schematic diagram of a structure of an ingredient storage and feeding apparatus of an automatic cooking system of the present invention.
Figure 3:
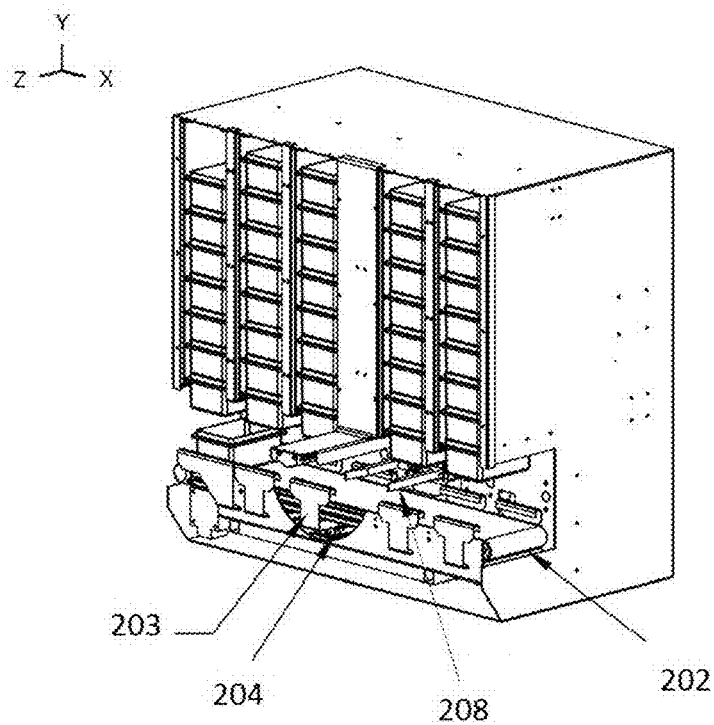
FIG. 3 is a schematic diagram of a connection structure of a clamping plate and a pneumatic gripper of an automatic cooking system of the present invention.
Figure 4:
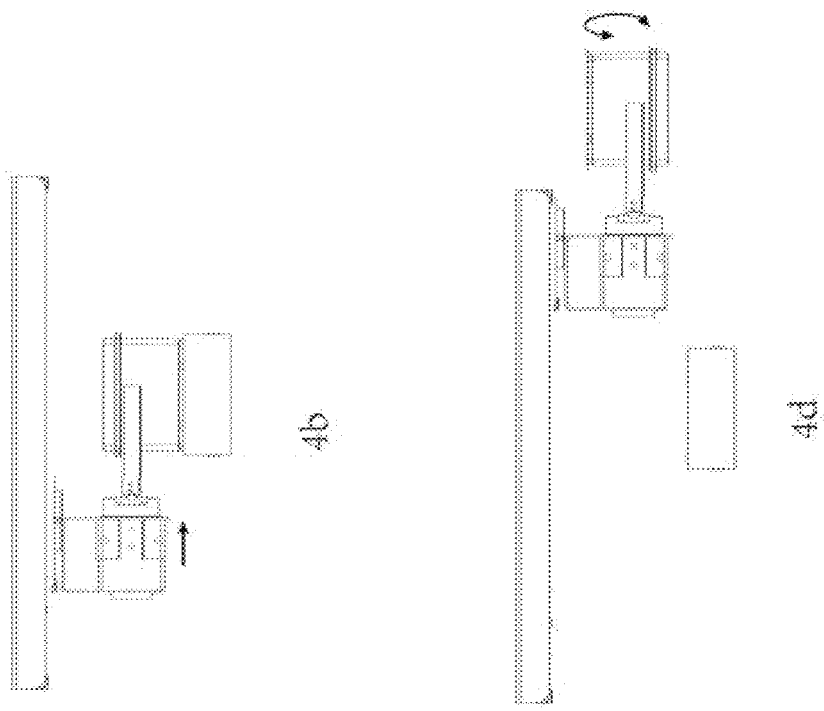
FIG. 4 is a schematic diagram of the connection operation of a linear drive apparatus and a rotary gripper of an automatic cooking system of the present invention.
Figure 4:
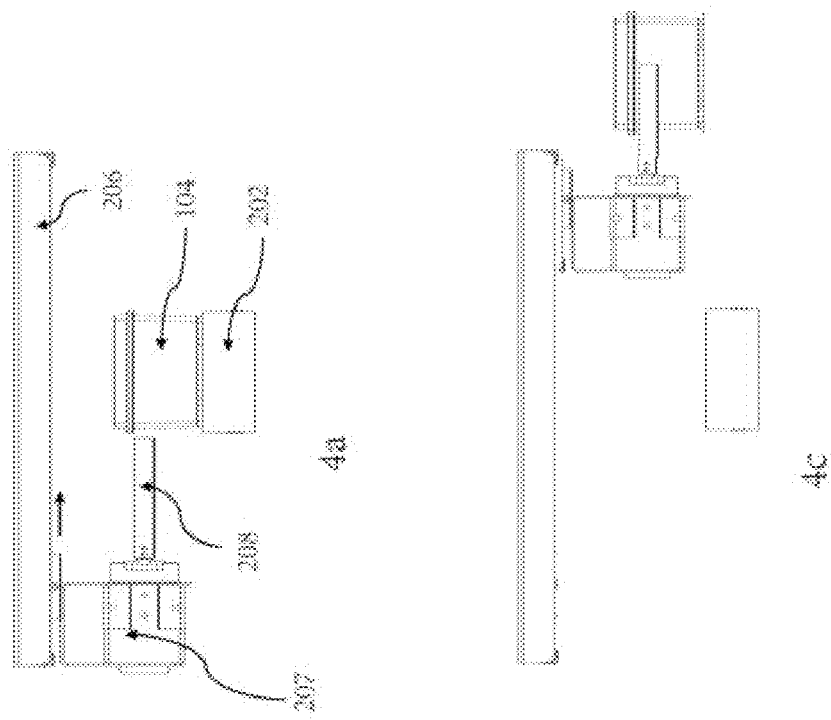
Figure 5:
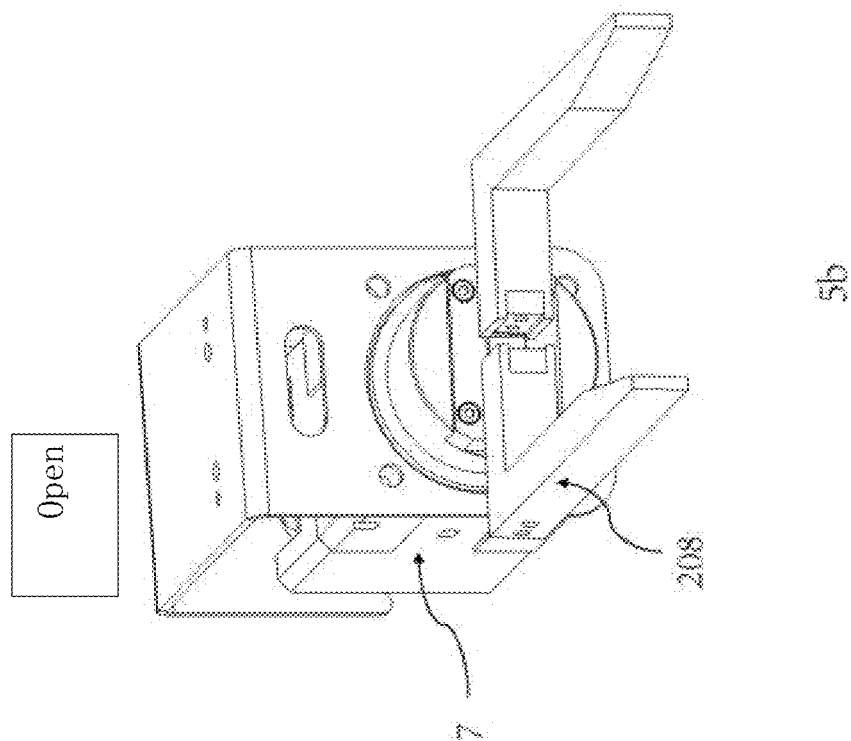
FIG. 5 is a schematic diagram of a connecting structure of a rotary gripper and a clamping jaw of an automatic cooking system of the present invention.
Figure 5:
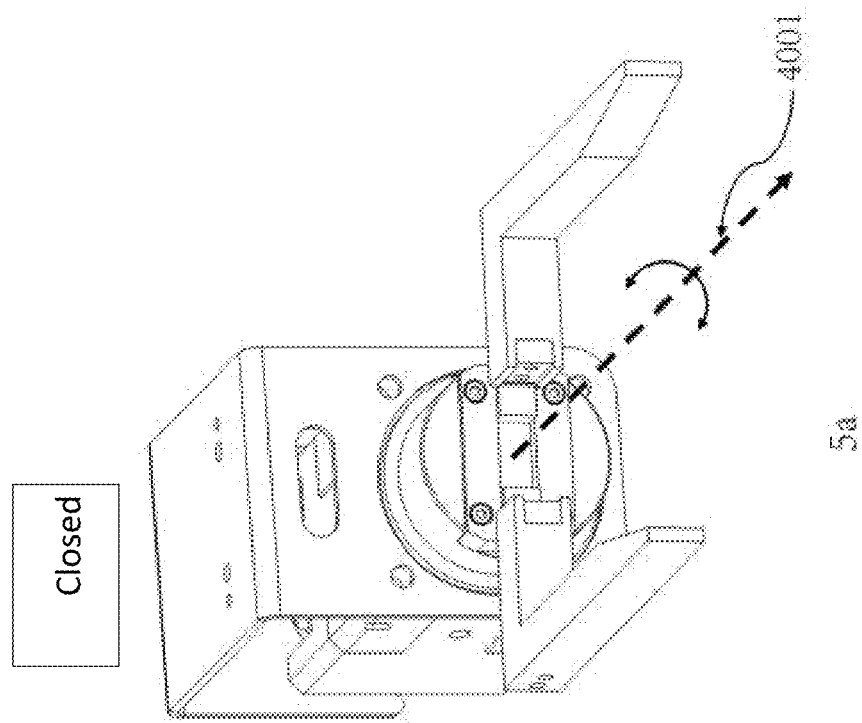

As shown in FIG. 1, an automatic cooking system with a cooking apparatus 400, which comprises a cooking tool 402, wherein it comprises an ingredient storage and feeding apparatus 100, and an ingredient conveying and dispensing apparatus 200; the ingredient storage and feeding apparatus 100 comprises a plurality of storage units 101, each storage unit 101 is provided with an inlet 102 and an outlet 103; a plurality of ingredient boxes 104 are provided between the inlet 102 and the outlet 103; the ingredient conveying and dispensing apparatus 200 is provided with a work position 201, which is located on one side of the cooking tool 402, especially adjacent to and slightly higher than the cooking tool 402; and the ingredient conveying and dispensing apparatus 200 transports the ingredient boxes 104 along the X, Y and Z axes to the work position 201 and then rotates, thereby causing the ingredient boxes 104 to turn over and pour the required ingredients into the cooking tool 402. In this way, a plurality of separately provided ingredient boxes realize the classified storage and on-demand supply of the ingredients, and the intelligent transportation along the X, Y and Z axes realizes the integrated automation of the orderly feeding by the ingredient boxes, and ensures that the ingredients are fresh without change in the taste.

As shown in FIG. 2 to 5, they are preferred embodiments of the present invention, wherein the inlet 102 and the outlet 103 are respectively located at the upper and lower ends of the storage units 101; the ingredient boxes 104 are provided with ribs 106 sequentially arranged inside the storage units 101 in order from top to bottom; the upper and lower boxes can be plugged; and blocking arms 105 are provided on both sides of the outlet 103 to support the lowest ribs of the ingredient boxes so as to support all the ingredient boxes in the storage unit. The ingredient conveying and dispensing apparatus 200 comprises a horizontal transfer apparatus 202 located below the storage unit 101 and arranged along an X-axis direction; wherein the horizontal transfer apparatus 202 can be a conveyor belt with a drive apparatus; a plurality of groups of opposed clamping plates 203 corresponding to each of the storage units 101 are provided on both sides of the horizontal transfer apparatus 202; a pneumatic gripper 204 is provided at the bottom joint of the two opposed clamping plates 203; a plurality of proximity sensors 209 are provided around the horizontal transfer apparatus 202; the work position 201 is located on the horizontal transfer apparatus 202 and is in the same horizontal position as the cooking tool 402, and the cooking tool 402 is located adjacent to the outside of the work position 201; the ingredient conveying and dispensing apparatus 200 further comprises a vertical moving apparatus 205, the horizontal moving apparatus 202 is arranged on the vertical moving apparatus 205 and can move up and down along the Y axis as a whole, and the vertical moving apparatus 205 may be an electric screw. The inner side of the work position 201 is further provided with a linear drive apparatus 206 extending forward, namely, arranged along the Z axis, and a rotary gripper 207 is provided below it; the rotary gripper 207 extends forward with a clamping jaw 208; the linear drive apparatus 206 can drive the rotary gripper 207 to move back and forth along the Z axis to above the cooking tool 402; and the rotary gripper 207 can drive the clamping jaw 208 to rotate and open and close along a first rotating shaft 4001.

Figure 6:
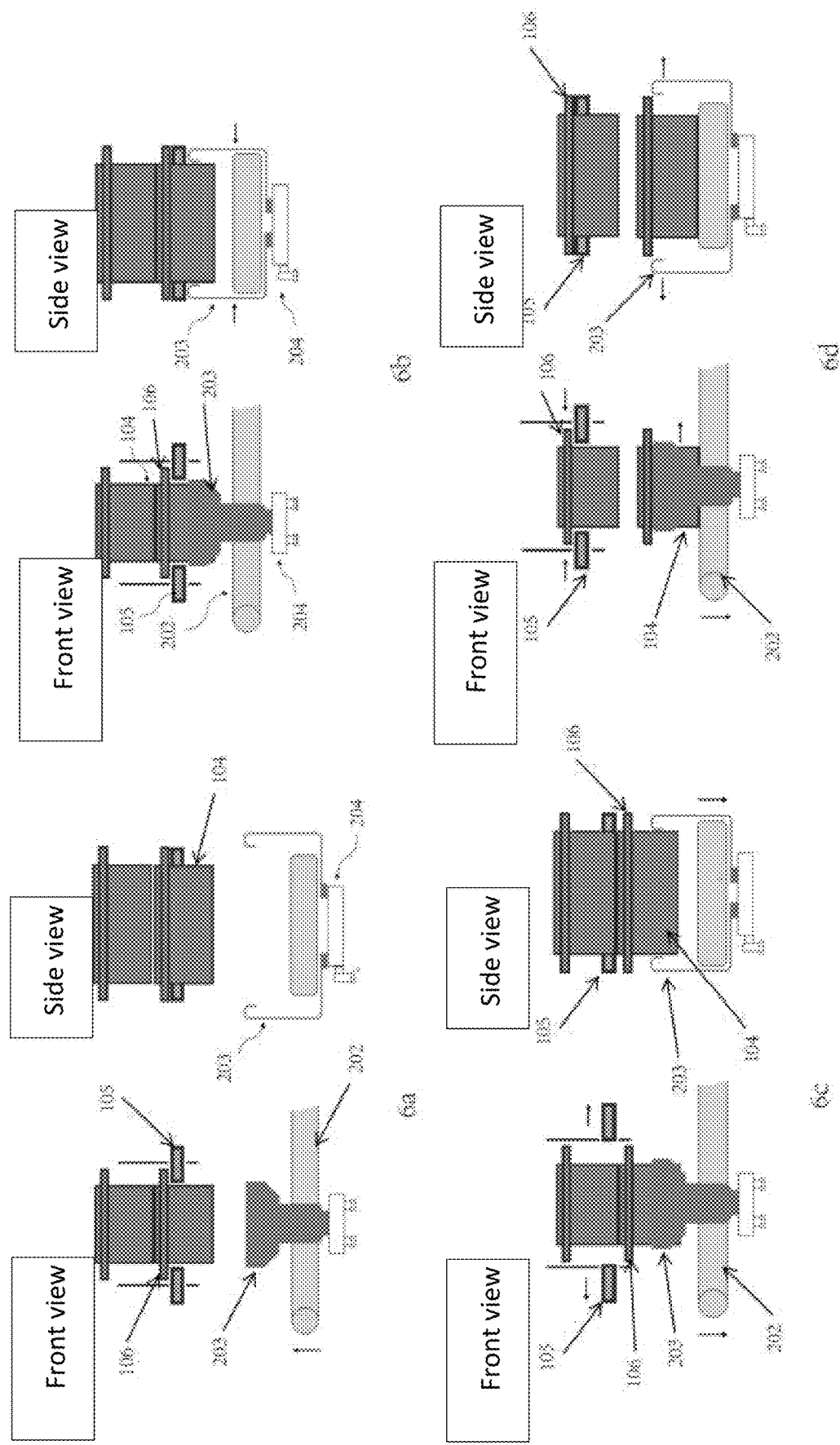
FIG. 6 is a schematic diagram of the ingredient transportation process of an automatic cooking system of the present invention.
Figure 7:
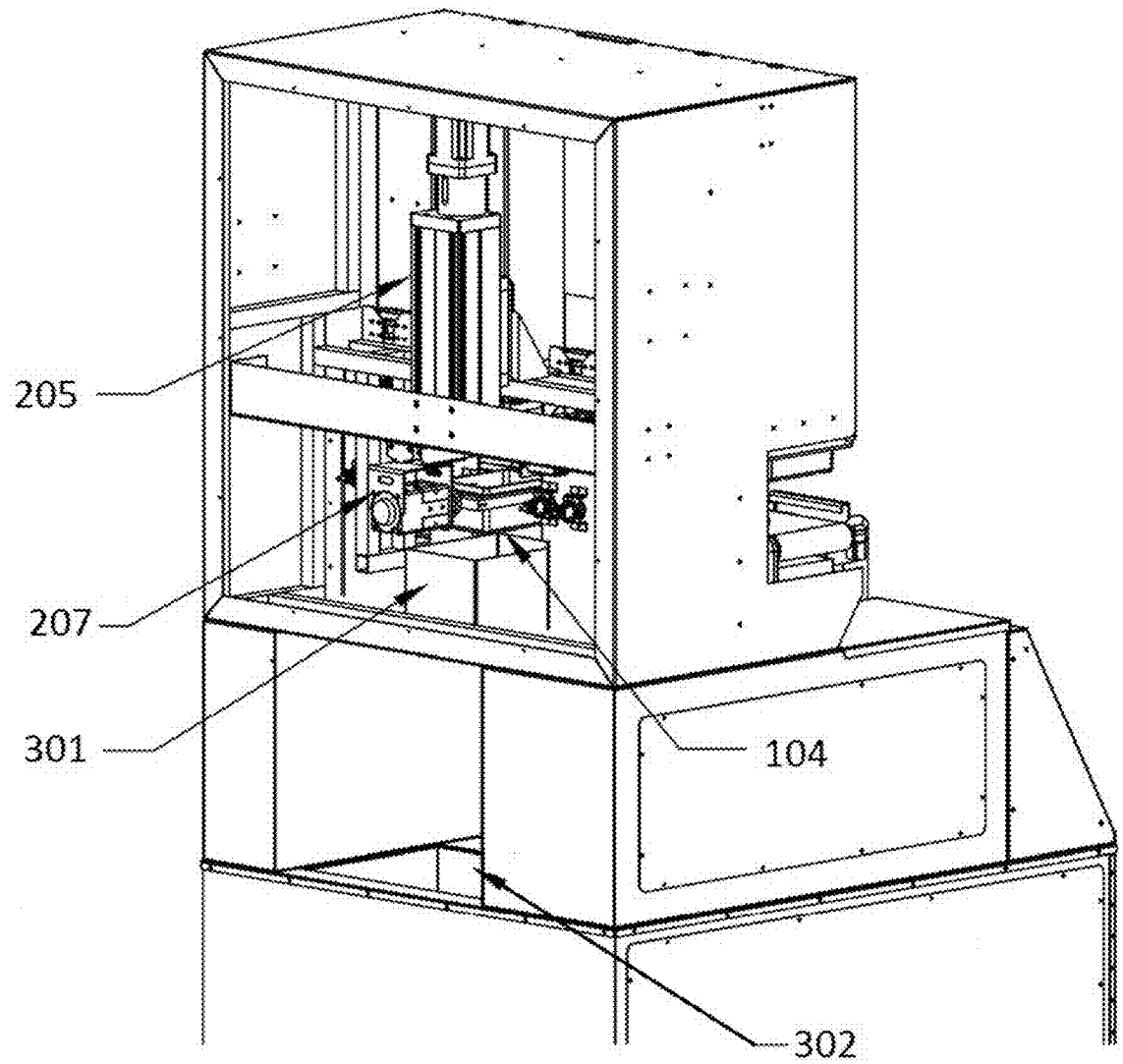
FIG. 7 is a schematic diagram of a structure of an ingredient box recovery apparatus of an automatic cooking system of the present invention.
Figure 8:
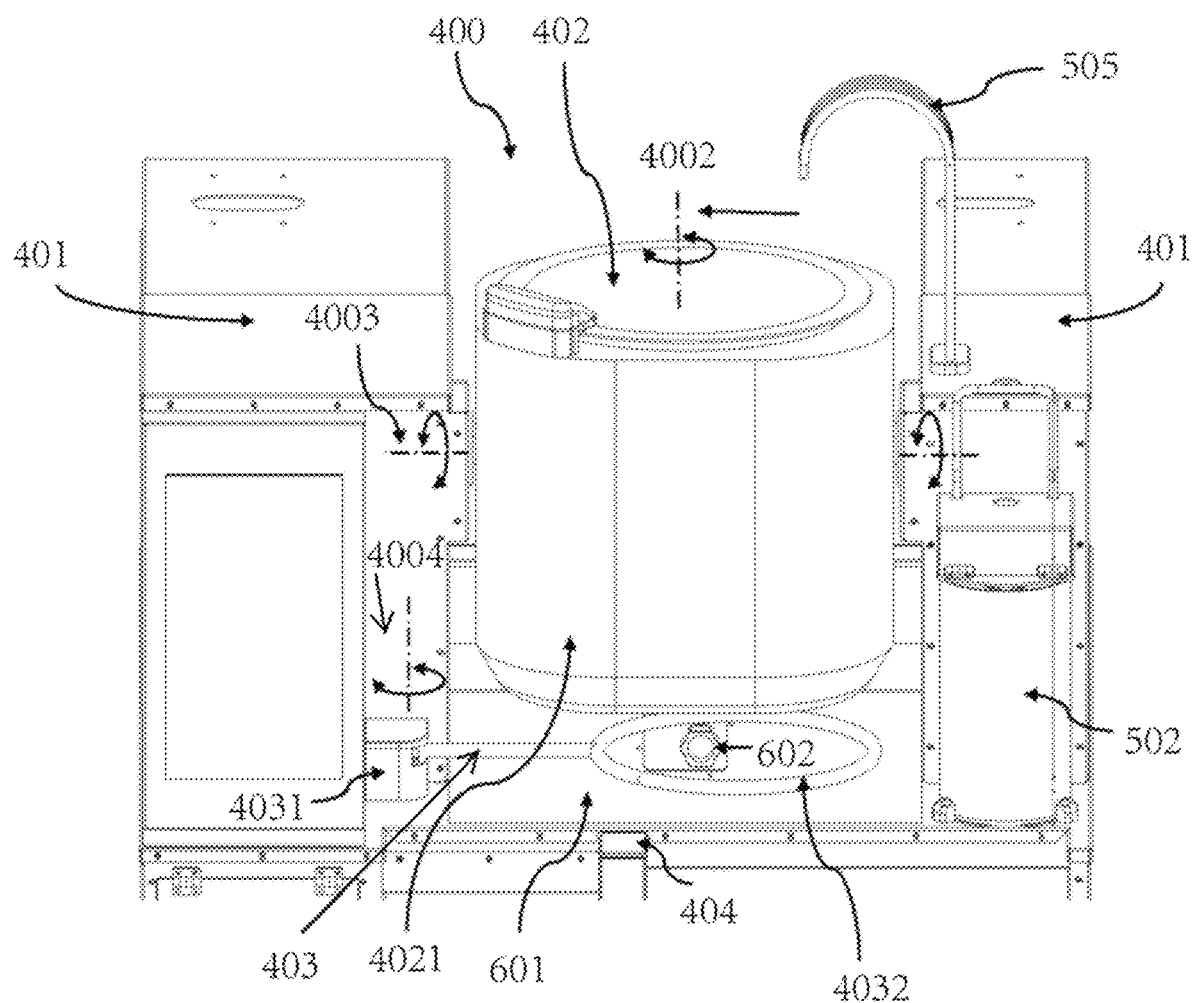
FIG. 8 is a schematic diagram of an overall structure of a cooking apparatus of an automatic cooking system of the present invention.
Figure 9:
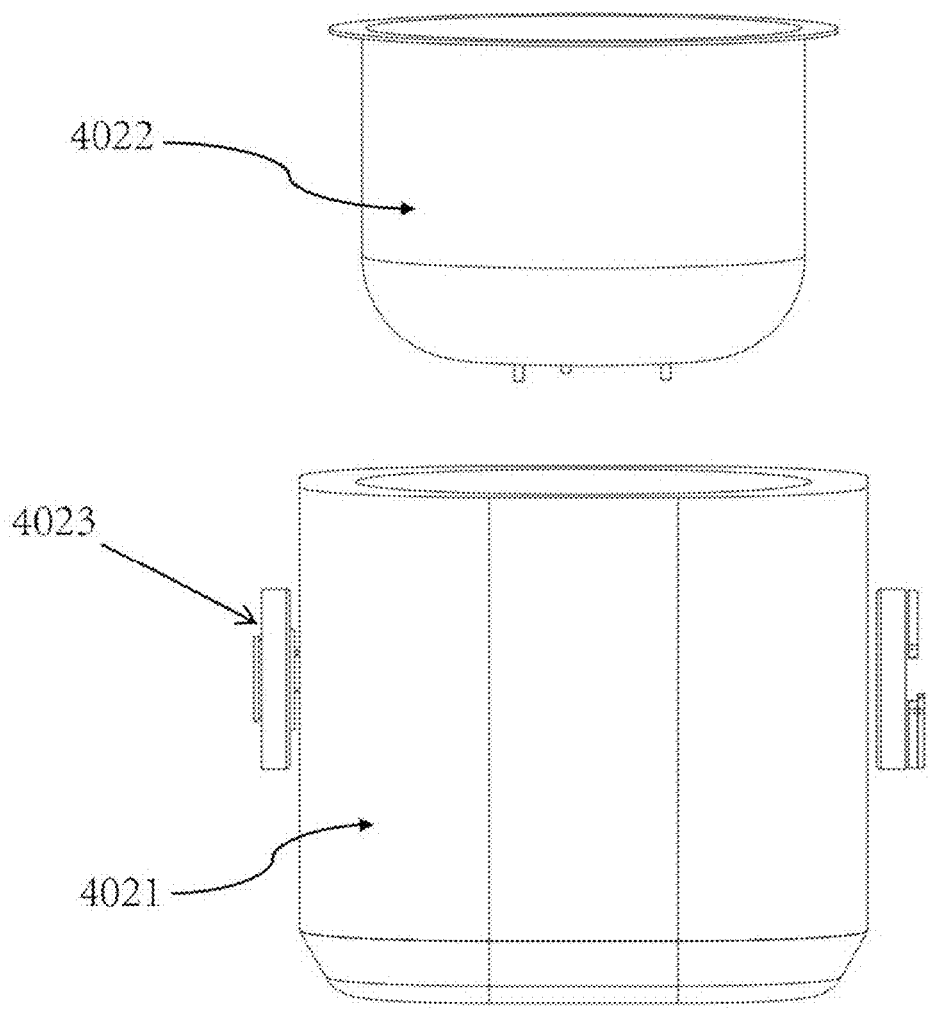
FIG. 9 is a schematic diagram of the connection relationship between a cooking pot box and a cooking pot of an automatic cooking system of the present invention.
Figure 10:
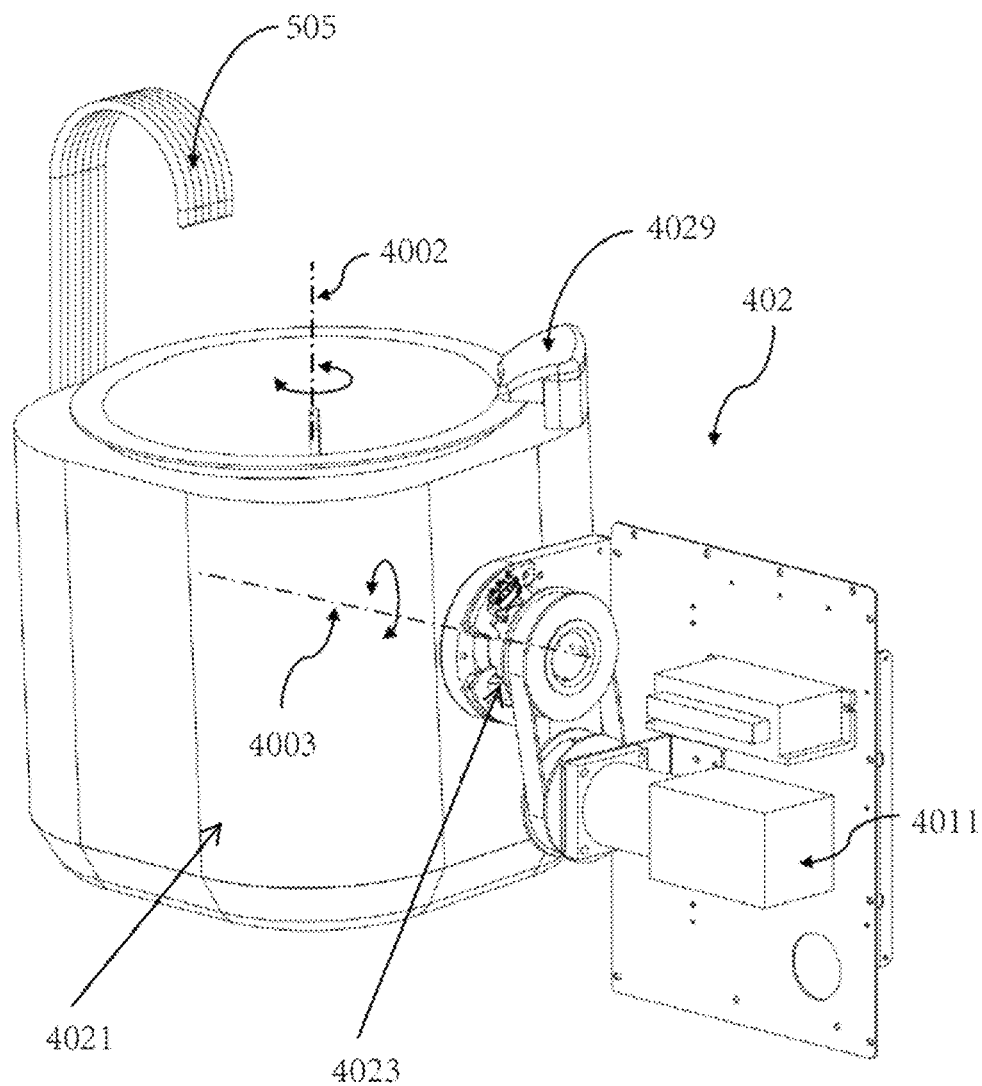
FIG. 10 is a schematic diagram of a structure of a cooking pot box of an automatic cooking system of the present invention.
Figure 11:
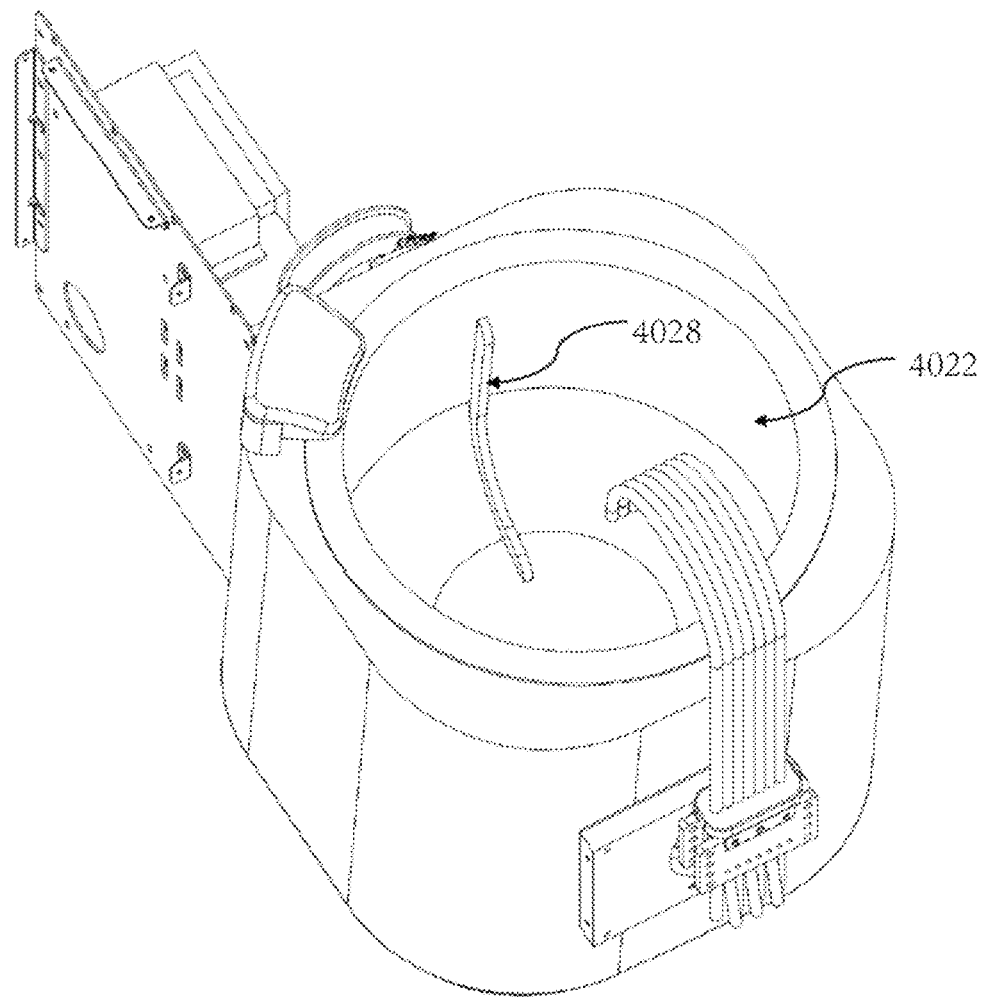
FIG. 11 is a schematic diagram of a structure of the inside of a cooking pot of an automatic cooking system of the present invention.
Figure 12:
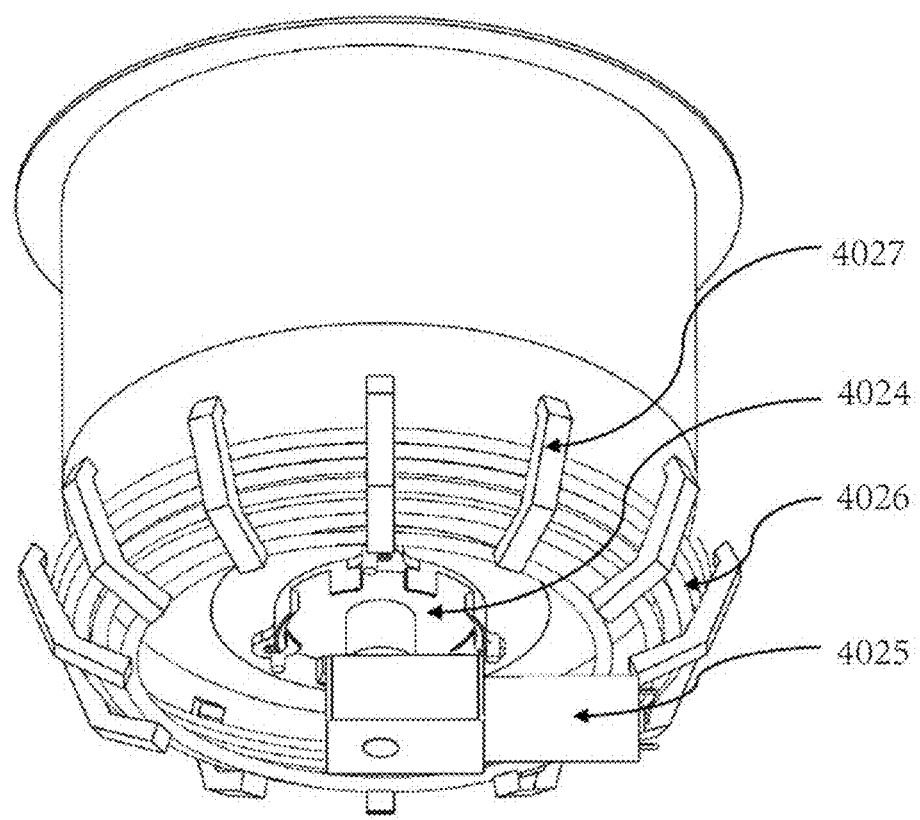
FIG. 12 is a schematic diagram of a structure of the bottom of a cooking pot of an automatic cooking system of the present invention.
Figure 13:
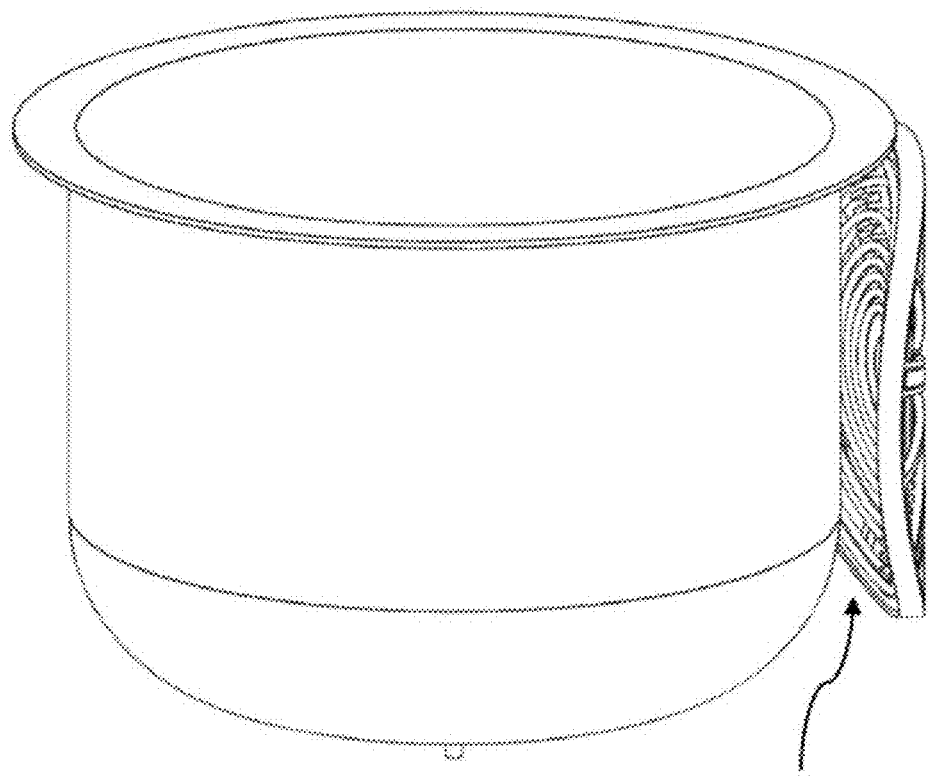
FIG. 13 is a schematic diagram of a structure of the outer wall of a cooking pot of an automatic cooking system of the present invention.
Figure 14:
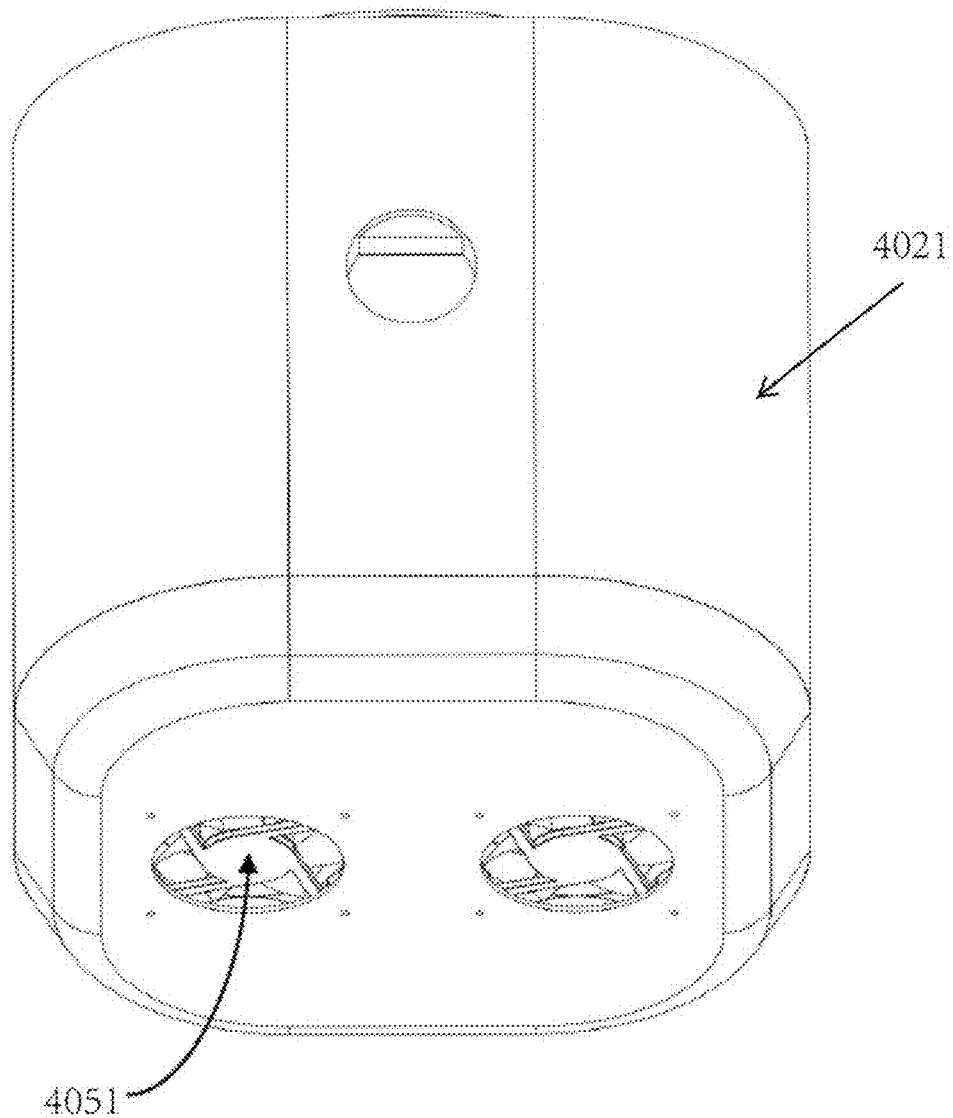
FIG. 14 is a schematic diagram of a structure of the bottom of a cooking pot box of an automatic cooking system of the present invention.
Figure 15:
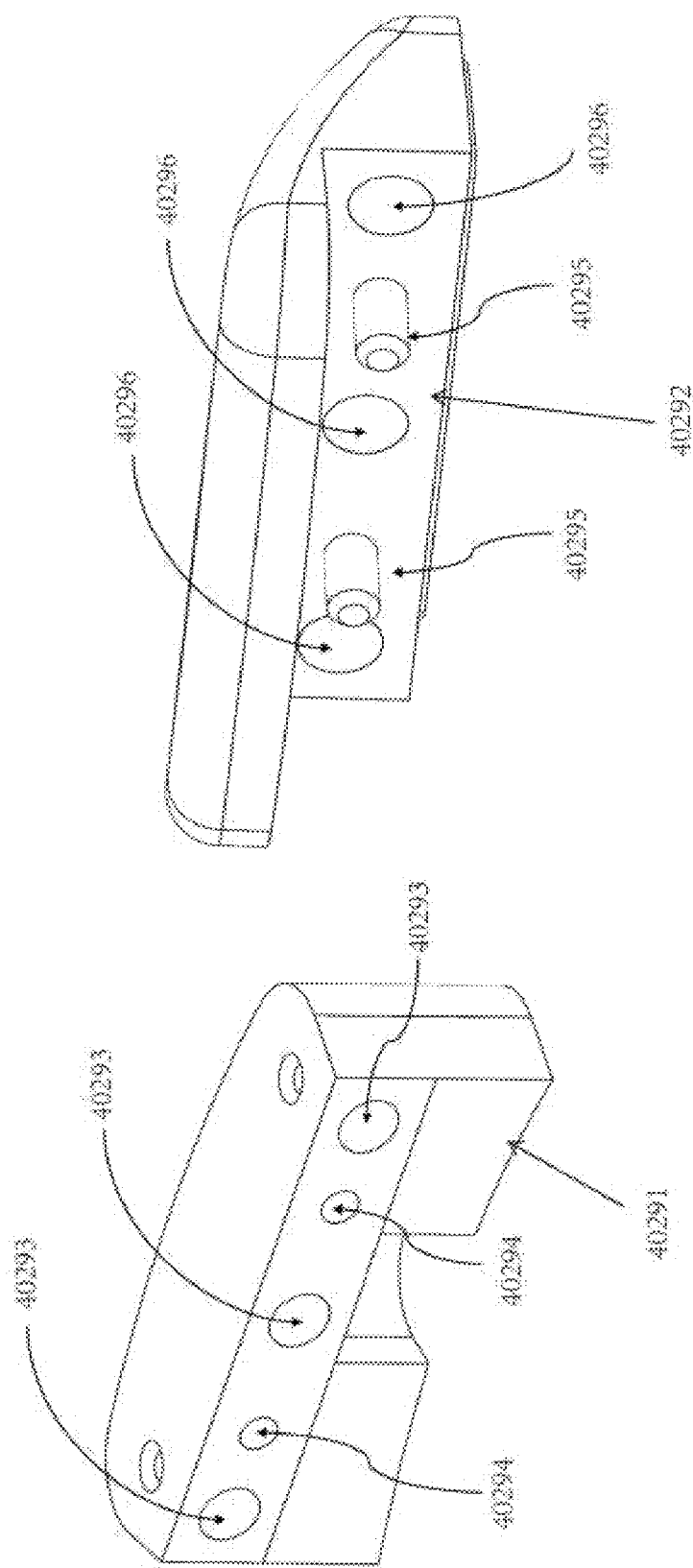
FIG. 15 is a schematic diagram of a structure of a base portion of a plug of a cooking pot box of an automatic cooking system of the present invention.

As shown in FIGS. 6 and 7, they are schematic diagrams of the operation process of the ingredient conveying and dispensing apparatus 200 in use. When pressurized air is applied, the pneumatic gripper 204 is activated to drive the clamping plate 203 to be opened, and at the same time the vertical moving apparatus 205 drives the horizontal transfer apparatus 202 and the clamping plate 203 to move vertically upwards. When moving to the outlet 103 of the storage unit 101, the pneumatic clamp 204 drives the clamping plate 203 to be closed, and at the same time the blocking arm 105 is opened to both sides, and then the vertical moving apparatus 205 drives the horizontal transfer apparatus 202 and the clamping plate 203 together with the ingredient box 104 to move down to the original position. The proximity sensor 209 activates the pneumatic gripper 204 to drive the clamping plate 203 to be opened after sensing the presence of the ingredient box 104 on the horizontal transfer apparatus 202, and the horizontal transfer apparatus 202 drives the ingredient box 104 to move along the X axis to the work position 201. When the ingredient box 104 moves to the work position 201, the linear drive apparatus 206 drives the rotary gripper 207 to move forward along the Z axis, and after reaching the work position 201, the clamping jaw 208 is driven to be closed and to grasp the conveyed ingredient box 104 and continue to move forward. After reaching directly above the cooking pot 4022, the rotatory gripper 207 drives the clamping jaw 208 to rotate by 180 degrees around the axis 210 to drive the ingredient box 104 to turn over, so that the ingredients in the box will fall into the cooking pot 4022 due to gravity.

As shown in FIG. 7, it is a schematic diagram of the structure of a recovery apparatus, wherein the ingredient storage and feeding apparatus 100 is provided with a recovery apparatus 300 at the bottom, which comprises an ingredient box circulation channel 301 and a recovery box 302, the diameter of the ingredient box circulation channel 301 is larger than the ingredient box 104; the recovery box 302 is located below the ingredient box circulation channel 301; after the ingredient box (104) turns over and feeds and after the rotating gripper 207 drives the clamping jaw 208 to recover and move toward to just above the ingredient box circulation channel 301, the clamping gripper 208 is driven to open and the ingredient box 104 falls vertically into the recovery box 302.

As shown in FIG. 8 to 15, they are schematic diagrams of the structure of the cooking apparatus and the key components thereof, wherein the cooking apparatus 400 further comprises a peripheral supporting structure 401 and a dishing-up tool 403; the inner wall on one side of the supporting structure 401 is provided with a rotation drive apparatus 4011, which can drive the cooking tool 402 to rotate along a third rotating shaft 4003; a plate sensor 404 is provided on the outer edge; the cooking tool 402 is located in the middle of the supporting structure, it comprises a cooking pot box 4021, the inside of which is provided with a cooking pot 4022, and the outer wall is provided with a rotation connection apparatus 4023; the inner wall of the cooking pot 4022 is provided with a stirring wing 4028, and the bottom center is provided with a coupling apparatus 4024 connected with a drive apparatus 4025, and a plurality of heating apparatuses 4026 are provided around the bottom and on the outer wall; wherein the coupling apparatus 4024 can also be a gear+belt connection structure, the drive apparatus 4025 is a DC motor; the stirring wing 4028 can extend inwardly by 1 cm to 6 cm; the rotation connection apparatus 4023 is connected to the rotation drive apparatus 4011 to drive the cooking pot box 4021 to rotate; wherein the connection apparatus 4023 can be a belt+pulley structure, and the rotation drive apparatus 4011 is a motor; the dishing-up tool 403 comprises a control apparatus 4031 and a dishing-up rack 4032, wherein the control apparatus 4031 is fixed on one side of the supporting structure, and its outer end is flexibly connected to the dishing-up rack 4032, the dishing-up rack 4032 extends to just below the bottom of the cooking pot box 4021, the control apparatus 4031 drives the dishing-up rack 4032 to rotate along a fourth rotating shaft 4004.

Furthermore, the cooking apparatus 400 further has the following characteristics. The upper edge of the cooking pot box 4021 is provided with a plug 4029, which comprises a base portion 40291 and an insertion portion 40292, the side wall of the base portion 40291 is provided with a plurality of openings 40294 and a first magnet 40293, the insertion portion 40292 is provided with a pin 40295 corresponding to the openings 40294 and a second magnet 40296 corresponding to the first magnet 40293; and the plug 4029 has a magnetic coupling characteristic to prevent the cooking pot 4022 from accidentally falling off the cooking pot box 4021; wherein the base portion 40291 and the insertion portion 40292 can also be fixed by screwing and other methods; the bottom of the cooking pot box 4021 is provided with a fan 4051 for heat dissipation; a plurality of third magnets 4027 are provided around the bottom of the cooking pot 4022 for locking the cooking pot 4022 and making it easy to replace at the same time; and the inner wall of the cooking pot 4022 is coated with a non-adhesive coating for preventing food from being stuck in the pot.

In addition, the cooking apparatus 400 may further have the following characteristics. The cooking pot 4022 is preferably made of stainless steel, iron and other metals with high magnetic permeability or their mixtures, so that it can generate a changing magnetic field through an induction heating coil placed near the pot, wherein the constantly changing magnetic field (eddy current) will quickly heat up the pot; the cooking apparatus 400 may further comprises a temperature sensor to control the temperature feedback of the cooking pot 4022; wherein the temperature sensor may be an infrared sensor located at the back of the cooking pot so that it can realize temperature adjustment and control through software.

Figure 16:
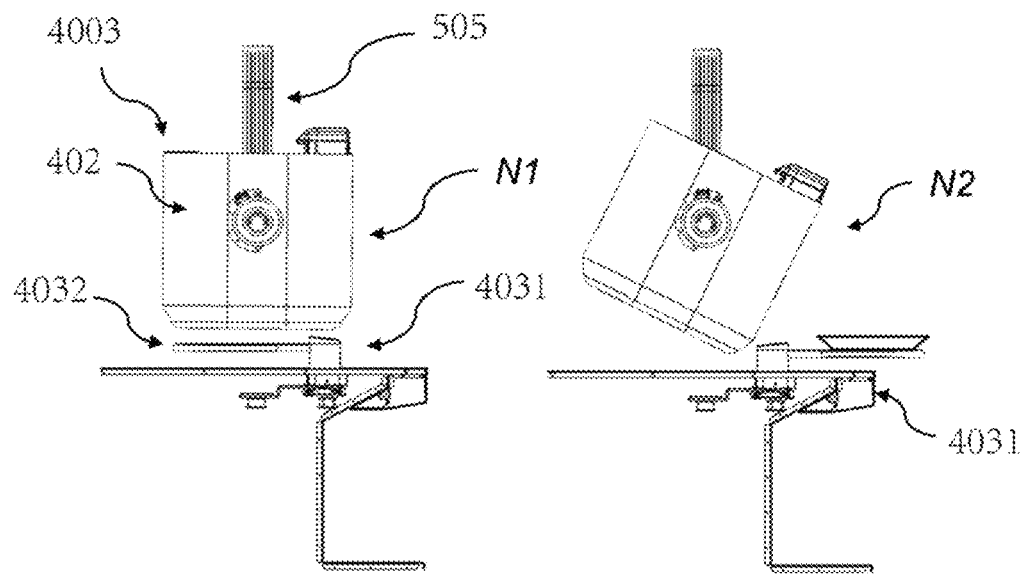
FIG. 16 is an explanatory diagram of the movement direction of a cooking pot box of a cooking apparatus of an automatic cooking system of the present invention during the ingredient distribution, cooking, dishing up and cleaning.
Figure 16:
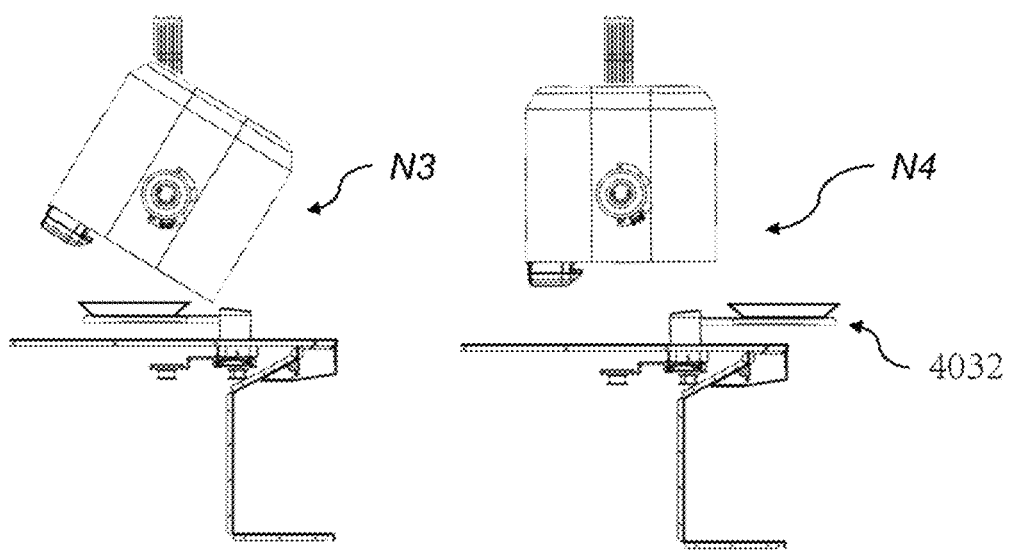

As shown in FIG. 16, during cooking with the cooking apparatus 400, the cooking pot 4022 may operate according to the following steps.

1. When the initial ingredients and sauce are distributed, the cooking tool 402 is preferably vertically upward (such as in the N1 direction), so that the ingredients or sauce can fall into the pot under gravity;
2. During cooking and mixing, the cooking tool 402 is preferably rotated by an angle of 30 to 90 degrees (such as in the N2 direction) to ensure that the mixing wing 4028 can effectively mix the ingredients and sauce; at this time, the rotation drive apparatus 4011 starts to drive the cooking pot 4022 to rotate around the second rotating shaft 4002, and the heating apparatus 4026 starts heating;
3. If some ingredients or sauce need to be added, the cooking tool 402 returns to the vertical upward direction (such as in the N1 direction), and repeats the steps of distributing ingredient and sauce, cooking, and stirring;
4. After the cooking process is completed, the cooking tool 402 rotates to the dishing-up direction (such as in the N3 direction), and preferably rotates by an angle of 120 to 180 degrees, so that the prepared dishes fall into plates, bowls and other media on the dishing-up rack 4032;
5. After the dishing up is completed, the cooking pot will rotate to the cleaning direction (such as N4), and the rotation axis of the cooking tool 402 is preferably vertically downward, so that the cleaning nozzle 602 can spray pressurized water as a cleaning solution and/or pressurized steam upward during the rotation to the pot for cleaning.

Figure 17:
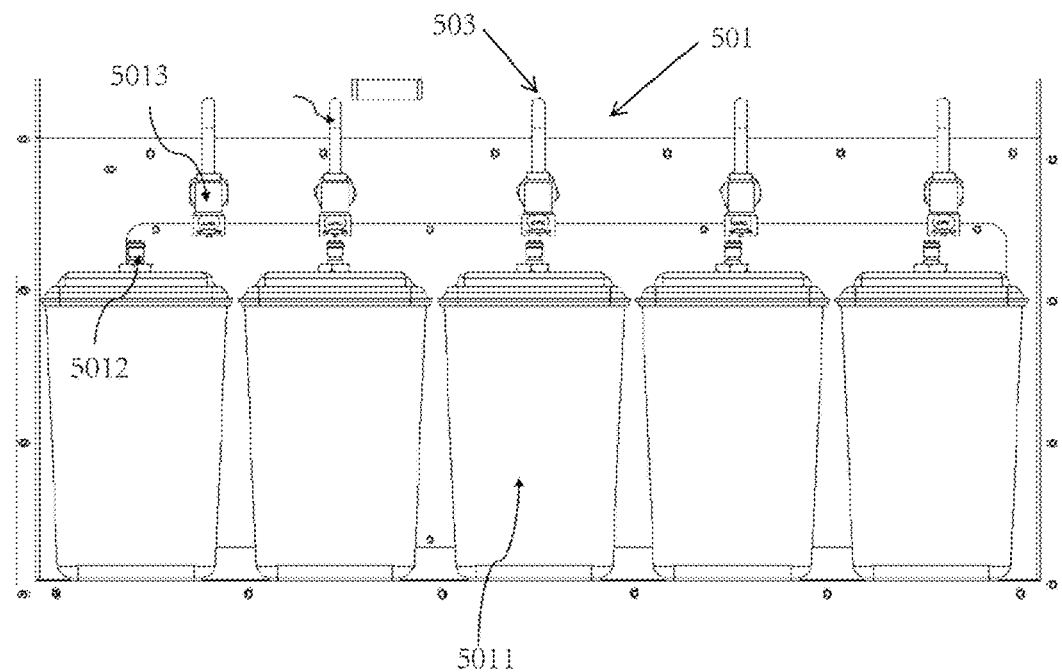
FIG. 17 is a schematic diagram of a structure of a seasoning storage apparatus of an automatic cooking system of the present invention.
Figure 18:
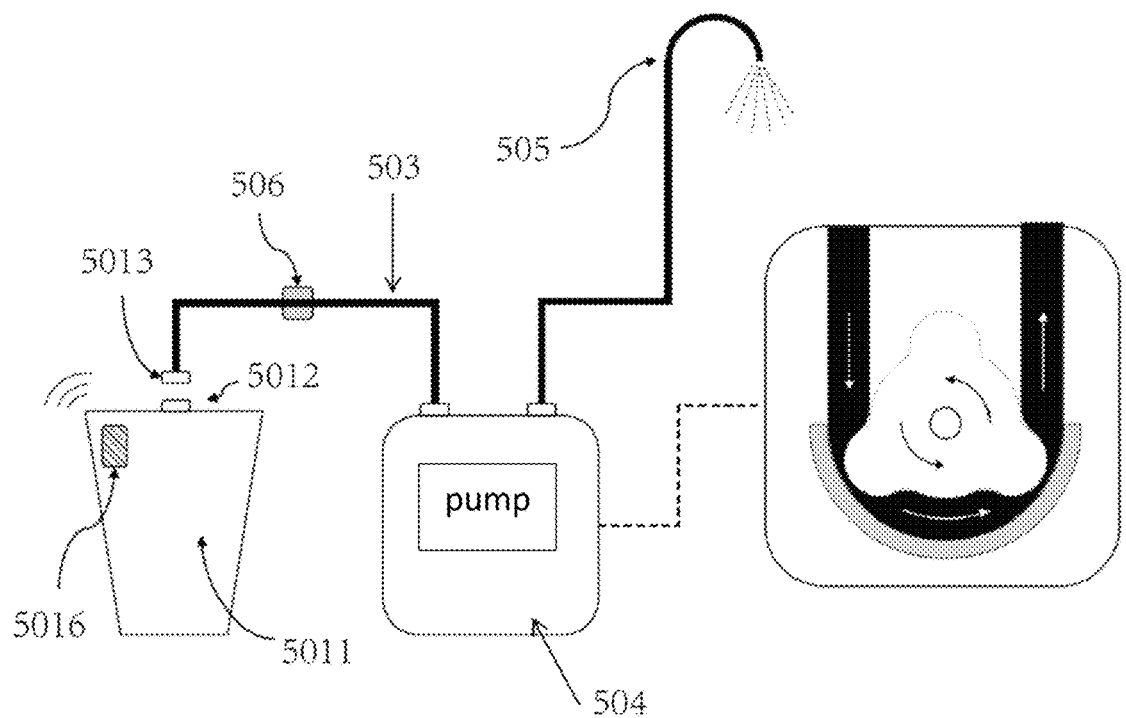
FIG. 18 is a schematic diagram of a connection structure of a seasoning storage apparatus of an automatic cooking system of the present invention.
Figure 19:
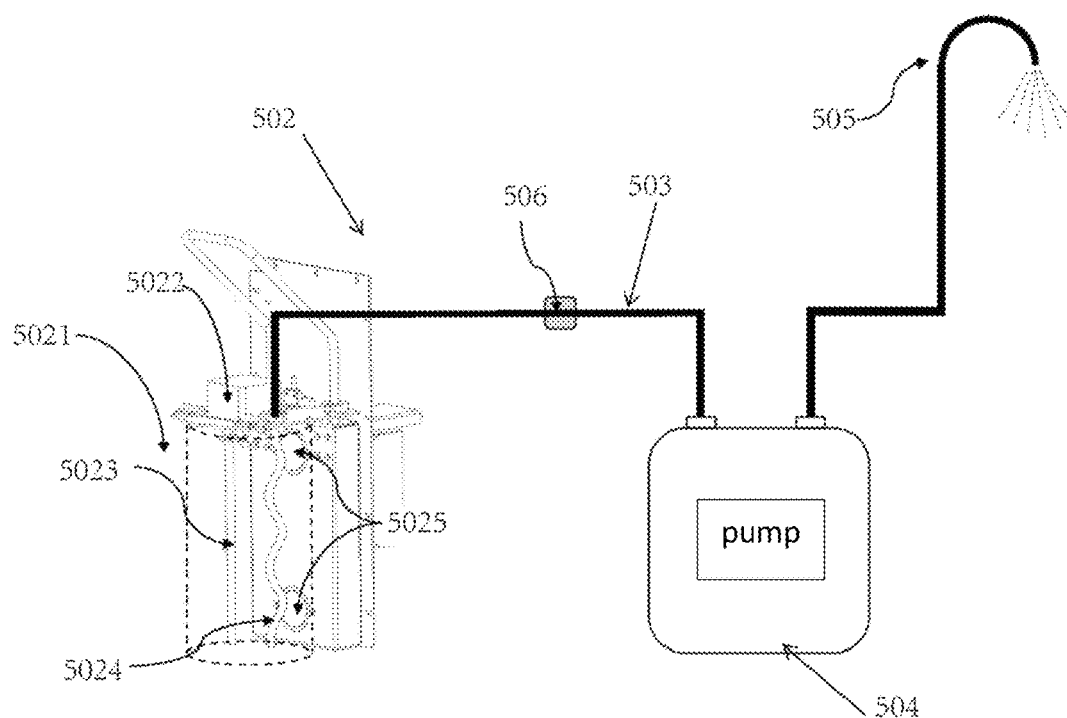
FIG. 19 is a schematic diagram of the structure and the connection relationship of a seasoning stirring apparatus of an automatic cooking system of the present invention.

As shown in FIG. 17 to 19, it is a schematic diagram of the structure of the seasoning dispensing apparatus 500 and the components thereof. It comprises a seasoning storage apparatus 501, a seasoning stirring apparatus 502, a seasoning transfer pipe 503 and a seasoning nozzle 505. The seasoning storage apparatus 501 comprises a plurality of sauce storage boxes 5011, the upper end of which is provided with an inner interface 5012; and the upper end of the inner interface 5012 is provided with a corresponding outer interface 5013; the outer interface 5013 is connected upwards with a seasoning transfer pipe 503 to extend to the corresponding seasoning nozzle 505; wherein a plurality of the sauce storage boxes 5011 can be placed above the open or covered shelf in the front of the cooking system as needed in order to facilitate replacement or cleaning; and the seasoning nozzle 505 can be configured to any angle suitable for spraying the sauce instead of being limited to a vertical downward angle.

the seasoning stirring apparatus 502 comprises a stirring box 5021, the inside of which is provided with one or more stirrers 5023, a straw 5024 and an upper and a lower water level sensors 5025, and its outer wall is provided with a stirring drive apparatus 5022 which is connected to the stirrers 5023; the straw 5024 is connected upward to a seasoning transfer pipe 503 and extends to the corresponding seasoning nozzle 505.

Further, the seasoning dispensing apparatus 500 further has the following characteristics: the seasoning transfer pipe 503 is connected to a seasoning pump 504 and a flow sensor 506; wherein the seasoning pump 504 is used to extracted the sauce from the sauce storage box 5011 or from the stirring box 5021; the flow sensor 506 can detect whether the sauce in the sauce storage box 5011 or the stirring box 5021 is emptied; the sauce storage box 5011 is provided with a radio frequency identification mark 5016 for identifying whether the sauce has expired; and the straw 5024 is of a spiral shape so as to further enhance the full mixing of the sauce when it is discharged.

Figure 20:
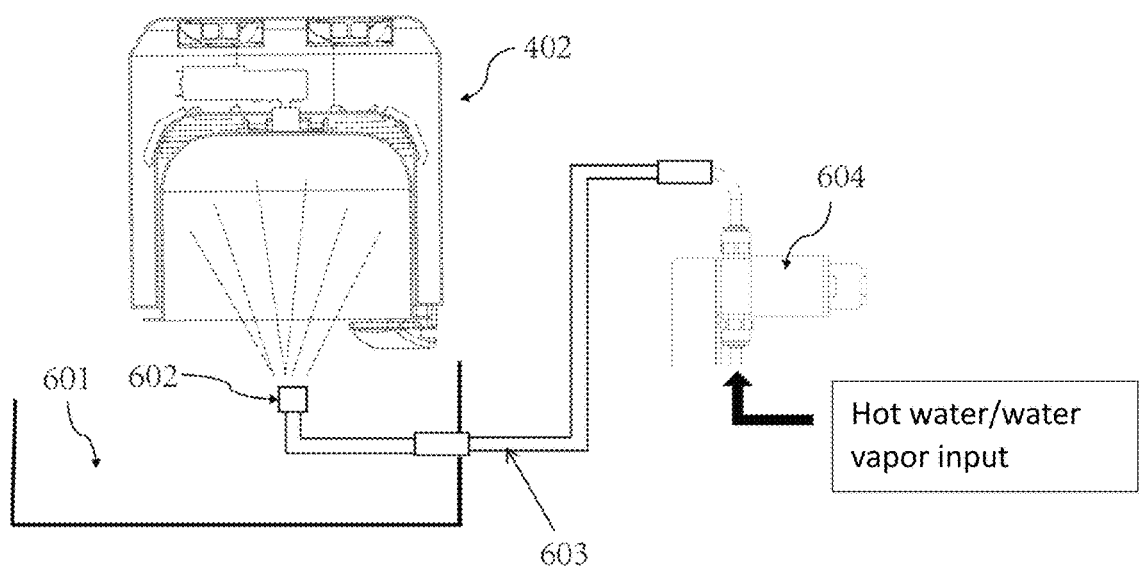
FIG. 20 is a schematic diagram of a structure of a cleaning apparatus of an automatic cooking system of the present invention.

As shown in FIG. 20, it is a schematic diagram of the structure of a cleaning apparatus 600, wherein it comprises a water tank 601 and a cleaning pipe 603; one end of the cleaning pipe 603 is provided with a cleaning nozzle 602, and the other end is connected to a water vapor input apparatus; the cleaning nozzle 602 is located above the water tank 601 and below the cooking pot box 4021, and it can rotate and spray water upward; and the cleaning pipe 603 is connected to a solenoid valve 604 to control the flow of liquid during cleaning.

Figure 21:
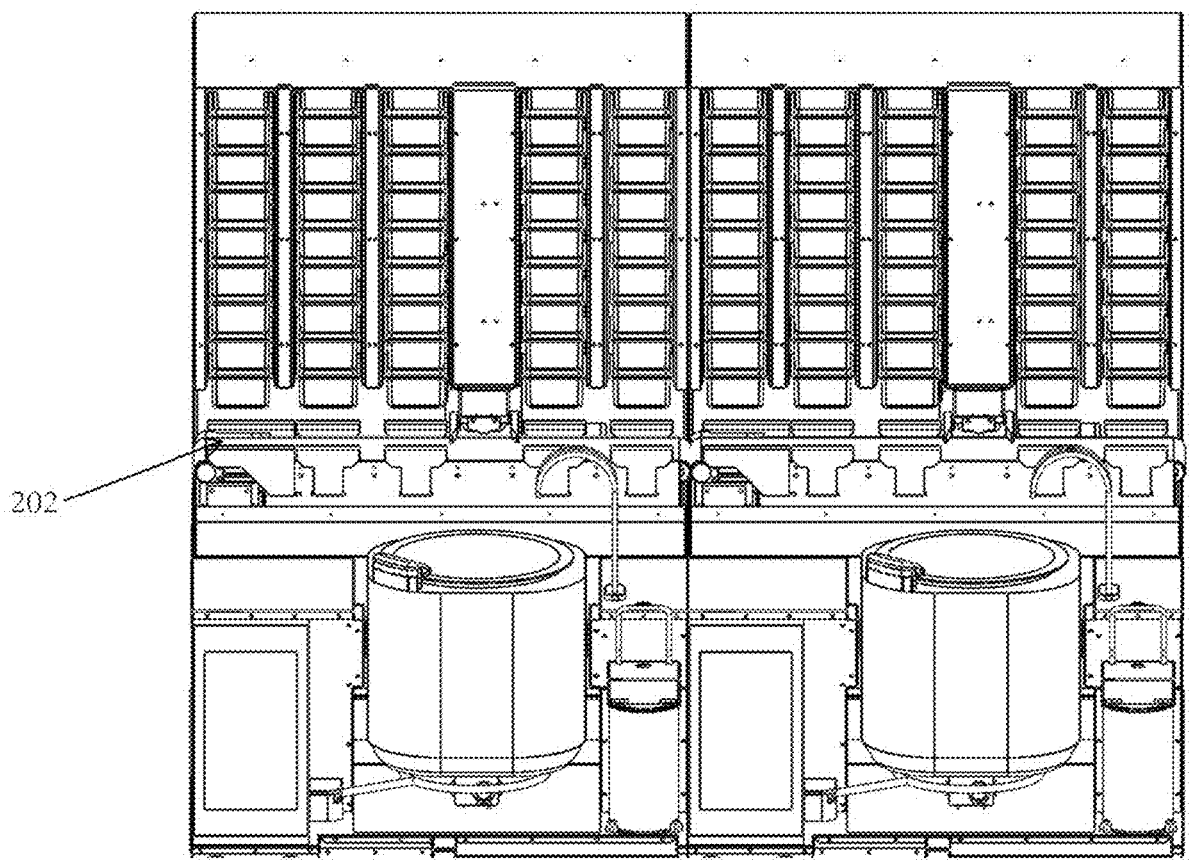
FIG. 21 is a schematic diagram of the joint operation of a plurality of automatic cooking systems of the present invention.

As shown in FIG. 21, it is a schematic diagram of the joint operation of a plurality of automatic cooking systems of the present invention, wherein the plurality of automatic cooking systems can be placed adjacent to each other, and the horizontal transfer apparatus 202 can realize the sharing of ingredients between adjacent systems.

The invention claimed is:

1. An automatic cooking system with a cooking apparatus, which comprises a cooking tool, comprising an ingredient storage and feeding apparatus, and an ingredient conveying and dispensing apparatus;

wherein, the ingredient storage and feeding apparatus comprises a plurality of storage units and a plurality of ingredient boxes, wherein each storage unit is provided with an inlet and an outlet, and the plurality of ingredient boxes are provided between the inlet and the outlet;

the ingredient conveying and dispensing apparatus is provided with a work position, which is located on one side of the cooking tool; and the ingredient conveying and dispensing apparatus transports the ingredient boxes along the X, Y and Z axes to the work position and then rotates, thereby causing the ingredient boxes to turn over and pour the required ingredients into the cooking tool.

2. The automatic cooking system according to claim 1, wherein the inlet and the outlet are respectively located at the upper and lower ends of the storage units; each of the ingredient boxes is provided with a rib sequentially arranged inside the storage units in order from top to bottom; blocking arms are provided on both sides of the outlet;

the ingredient conveying and dispensing apparatus comprises a vertical moving apparatus and a horizontal transfer apparatus arranged on the vertical moving apparatus, the horizontal transfer apparatus is located below the storage units, is deployed and runs along the X axis, and moves along the Y axis through the vertical moving apparatus;

a plurality of groups of clamping plates corresponding to each of the storage units are provided on both sides of the horizontal transfer apparatus; a pneumatic gripper is provided at the bottom joint of one of the groups of clamping plates for opening and closing the one of the groups of clamping plates; a proximity sensor is provided beside each of the groups of clamping plates of the horizontal transfer apparatus; the horizontal transfer apparatus is provided with a work position, the work position is at the same horizontal position of the cooking tool; the ingredient conveying and dispensing apparatus further comprises a linear drive apparatus arranged along the Z axis, and a rotary gripper is connected below the linear drive apparatus; the rotary gripper extends forward with a clamping jaw; the linear drive apparatus drives the rotary gripper to move back and forth along the Z axis to above the cooking tool; and the rotating gripper drives the clamping jaw to rotate and open and close along a first rotating shaft.

3. The automatic cooking system according to claim 1, wherein a recovery apparatus is provided at the bottom of the ingredient storage and feeding apparatus, the recovery apparatus comprises an ingredient box circulation channel and a recovery box, the diameter of the ingredient box circulation channel is larger than that of the ingredient boxes; and the recovery box is located below the ingredient box circulation channel.

4. The automatic cooking system according to claim 1, wherein the cooking apparatus further comprises a peripheral supporting structure and a dishing-up tool;

the inner wall on one side of the supporting structure is provided with a rotation drive apparatus, which can drive the cooking tool to rotate along a third rotating shaft;

a plate sensor is provided on an outer edge of the bottom of the supporting structure;

the cooking tool is located in the middle of the supporting structure, the cooking tool comprises a cooking pot box, a cooking pot is arranged inside, and a rotating connection apparatus is arranged on an outer wall of the cooking pot box;

the inner wall of the cooking pot is provided with a stirring wing, the center of the bottom of the cooking pot is provided with a coupling apparatus connected with a driving apparatus, and a plurality of heating apparatuses are provided around the bottom and outer wall of the cooking pot;

the rotation connection apparatus is connected to the rotation driving apparatus to drive the cooking pot box to rotate;

the dishing-up tool comprises a control apparatus and a dishing-up rack, wherein the control apparatus is fixed on one side of the supporting structure, the outer end of the control apparatus is flexibly connected to the dishing-up rack, the dishing-up rack extends to directly below the bottom of the cooking pot box; and the control apparatus drives the dishing-up rack to rotate along a fourth rotating shaft.

5. The automatic cooking system according to claim 4, wherein the upper edge of the cooking pot box is provided with a plug, which comprises a base portion and an insertion portion, the side wall of the base portion is provided with a plurality of openings and a first magnet, and the insertion portion is provided with a pin corresponding to the openings and a second magnet corresponding to the first magnet;

a fan is provided at the bottom of the cooking pot box;

a plurality of third magnets are provided around the bottom of the cooking pot; and the inner wall of the cooking pot is coated with a non-adhesive coating.

6. The automatic cooking system according to claim 1, comprising a seasoning dispensing apparatus, which comprises a seasoning storage apparatus, a seasoning stirring apparatus, a seasoning transfer pipe and a seasoning nozzle;

the seasoning storage apparatus comprises a plurality of sauce storage boxes, the upper end of which is provided with an inner interface; a corresponding outer interface is provided above the inner interface; the outer interface is connected upwards with a seasoning transfer pipe to extend to the corresponding seasoning nozzle;

the seasoning stirring apparatus comprises a stirring box, the inside of which is provided with one or more stirrers, a straw and an upper and a lower water level sensors, and an outer wall of the seasoning stirring apparatus is provided with a stirring drive apparatus which is connected to the stirrers; and the straw is connected upward to a seasoning transfer pipe and extends to the corresponding seasoning nozzle.

7. The automatic cooking system according to claim 6, wherein a seasoning pump and a flow sensor are connected to the seasoning transfer pipe.

8. The automatic cooking system according to claim 7, wherein a radio frequency identification mark is provided on the sauce storage box; and the straw is spiral.

9. The automatic cooking system according to claim 1, comprising a cleaning apparatus, which comprises a water tank and a cleaning pipe; one end of the cleaning pipe is provided with a cleaning nozzle, and the other end is connected to a water vapor input apparatus;

the cleaning nozzle is located above the water tank and below the cooking pot box, and the cleaning nozzle can be rotated to spray water upward.

10. The automatic cooking system according to claim 9, wherein a solenoid valve is connected to the cleaning pipe.

* * * * *